(12) United States Patent
Urosu

(10) Patent No.: US 9,681,093 B1
(45) Date of Patent: Jun. 13, 2017

(54) GEOLOCATION IMPRESSIONS

(75) Inventor: Dan Cristian Urosu, Jersey City, NJ (US)

(73) Assignee: Google Inc., Mountain View, CA (US)

(*) Notice: Subject to any disclaimer, the term of this patent is extended or adjusted under 35 U.S.C. 154(b) by 1246 days.

(21) Appl. No.: 13/291,959

(22) Filed: Nov. 8, 2011

Related U.S. Application Data

(60) Provisional application No. 61/525,638, filed on Aug. 19, 2011.

(51) Int. Cl.
| | | |
|---|---|---|
| *G06F 15/16* | (2006.01) | |
| *H04N 7/14* | (2006.01) | |
| *H04N 5/76* | (2006.01) | |
| *G06F 17/30* | (2006.01) | |

(52) U.S. Cl.
CPC .............. *H04N 7/14* (2013.01); *G06F 17/30* (2013.01); *H04N 5/76* (2013.01)

(58) Field of Classification Search
CPC ............. H04N 7/14; H04N 5/76; G06F 17/30
USPC ........................................................ 709/204
See application file for complete search history.

(56) References Cited

U.S. PATENT DOCUMENTS

| | | | | |
|---|---|---|---|---|
| 2007/0242131 | A1* | 10/2007 | Sanz-Pastor et al. | ..... 348/14.02 |
| 2010/0205176 | A1* | 8/2010 | Ji et al. | ............ 707/737 |
| 2012/0200737 | A1* | 8/2012 | Jape et al. | ............ 348/231.2 |

OTHER PUBLICATIONS

Macalle, S., "Bizzabo is the New Event Based Social Networking Tool for Professionals," The Next Web, Sep. 15, 2011, 6 pages, http://thenextweb.com/socialmedia/2011/09/15/bizzabo-is-the-new-event-based-social-networking-tool-for-professionals/.
"Bizzabo," Crunch Base, Aug. 30, 2011, 1 page, http://www.crunchbase.com/company/bizzabo.
"What's Bizzabo?" BizzaboMedia channel on Youtube, Jan. 27, 2011, 1 page, http://www.youtube.com/watch?v=5kH-euex-Sg.
Bizzabo official page on Twitter, downloaded Nov. 30, 2011, 1 page, http://twitter.com/#!/Bizzabo.
Butcher, M., "TotalGigs Plans Live Location-based Content Sharing at Music Events [Springboard]," Tech Crunch Europe, Jul. 29, 2011, 1 page, http://eu.techcrunch.com/2011/07/29/totalgigs-plans-live-location-based-content-sharing-at-music-events-springboard.
Laborde, D., "Syncuz Introduces Real-time, Location-based Event Planning App for Android [Video]," Aug. 17, 2011, 4 pages, http://www.talkandroid.com/53714-syncuz-introduces-real-time-location-based-event-planning-app-for-iphone-video/.
Rogers, R., "How to Delay Sending a Message in Outlook," Tech-Recipes, Sep. 15, 2006, 2 pages, http://www.tech-recipes.com/rx/1638/how_to_delay_sending_message_outlook/.

* cited by examiner

*Primary Examiner* — Phuoc Nguyen
*Assistant Examiner* — Kishin G Belani
(74) *Attorney, Agent, or Firm* — Patent Law Works LLP

(57) ABSTRACT

A method for geolocation impressions includes determining, at a first computing device, a geolocation of the first computing device. Impressions entered in a first display of the first computing device while the first computing device is within a predetermined area including the geolocation, are identified. A target audience entered in the first display is also identified. Information regarding the geolocation, the target audience, and the impressions are sent to a server device, for making the impressions viewable by the target audience in a second display at a second computing device associated with the target audience when the target audience is within the predetermined area.

20 Claims, 12 Drawing Sheets

| UserID | Notification Preference | Display Preference | Impressions Left | Impressions Viewed |
|---|---|---|---|---|
| UserID #1 | ... | ... | ... | ... |
| UserID #2 | ... | ... | ... | ... |
| ... | ... | ... | ... | ... |
| UserID #U | ... | ... | ... | ... |

FIG. 9

| ImpressionID | Author | Target Audience | Impression | Geolocation | Status |
|---|---|---|---|---|---|
| ImpressionID #1 | ... | ... | ... | ... | ... |
| ImpressionID #2 | ... | ... | ... | ... | ... |
| ... | ... | ... | ... | ... | ... |
| ImpressionID #U | ... | ... | ... | ... | ... |

FIG. 10

GEOLOCATION IMPRESSIONS

CROSS REFERENCE TO RELATED APPLICATIONS

This application claims the benefit of the following provisional patent application, the disclosure of which is incorporated herein in its entirety by reference:

U.S. Provisional Patent Application No. 61/525,638 filed Aug. 19, 2011, entitled "Geolocation Impressions."

TECHNICAL FIELD

The disclosure generally relates to storing and rendering geolocation impressions.

BACKGROUND

A social network can be an online system that provides a forum for geographically separated users to interact with one another, where those users have defined a relationship between one another. Users can control who can view their information by identifying particular relationships with other users, and can also find new users from the group of other people who are "friends" of their own friends. Social networks can be aimed at different types of social interaction, such as friendship and business networking. A user of a social network can have a profile page (e.g., a web page on the social network) that provides information about the user to other users of the social network. A profile can include information regarding a user's acquaintance relationships (e.g., friends, colleagues, schoolmates, etc.) on the social network.

People visiting a particular location may be interested to know what others recommend doing and seeing near that location. One may use a tourist brochure, an anonymous review service like Yelp, or ask strangers for recommendations, but such information sources can be unreliable, as they are based on subjective evaluations of people that may have dissimilar interests. Furthermore, tourist brochures may suggest a large number of activities near a particular location, when the visitor has a limited amount of time to spend near the location. Accordingly, a need exists in the art for an improved solution for storing and rendering geolocation impressions.

BRIEF DESCRIPTION OF THE DRAWINGS

The accompanying drawings, which are incorporated into and constitute a part of this specification, illustrate one or more embodiments of the present disclosure and, together with the detailed description, serve to explain the principles and implementations of the present disclosure.

In the drawings:

FIG. 9 depicts a data structure for storing certain user information in accordance with some embodiments of the present disclosure.

FIG. 10 depicts a data structure for storing certain impression information in accordance with some embodiments of the present disclosure.

DESCRIPTION OF EXAMPLE EMBODIMENTS

Overview

According to some aspects of the present disclosure, a user uses a geolocation-capable computing device to tag places by uploading the users' impressions about a location while the user is present at the location. The term 'impression' as used herein encompasses its plain and ordinary meaning, including, but not limited to an idea, feeling, comment, or opinion about something or someone, stored on a digital medium. Example impressions include voice recordings, digital images, video recordings, URLs, or text messages. The term 'geolocation impression' as used herein encompasses its plain and ordinary meaning, including, but not limited to an impression that is associated with a geolocation. The impressions and associated geolocation data are stored, and made accessible to a target audience designated by the authors of the impressions. A user that is in the target audience may view geolocation impressions, in a display of a computing device associated with the user, when the computing device is at or near the geolocation associated with the impressions. The user may open or select the impression, to render the impression. The user may communicate further with the author of the impression and share the user's experience or ask the author more questions.

Embodiments of the present disclosure are described herein in the context of geolocation impressions. Those of ordinary skill in the art will realize that the following detailed description of the present disclosure is illustrative only and is not intended to be in any way limiting. Other embodiments of the present disclosure will readily suggest themselves to such skilled persons having the benefit of this disclosure. Reference will now be made in detail to implementations of the present disclosure as illustrated in the accompanying drawings. The same reference indicators will be used throughout the drawings and the following detailed description to refer to the same or like parts.

High Level Functional Description

Figure 1:
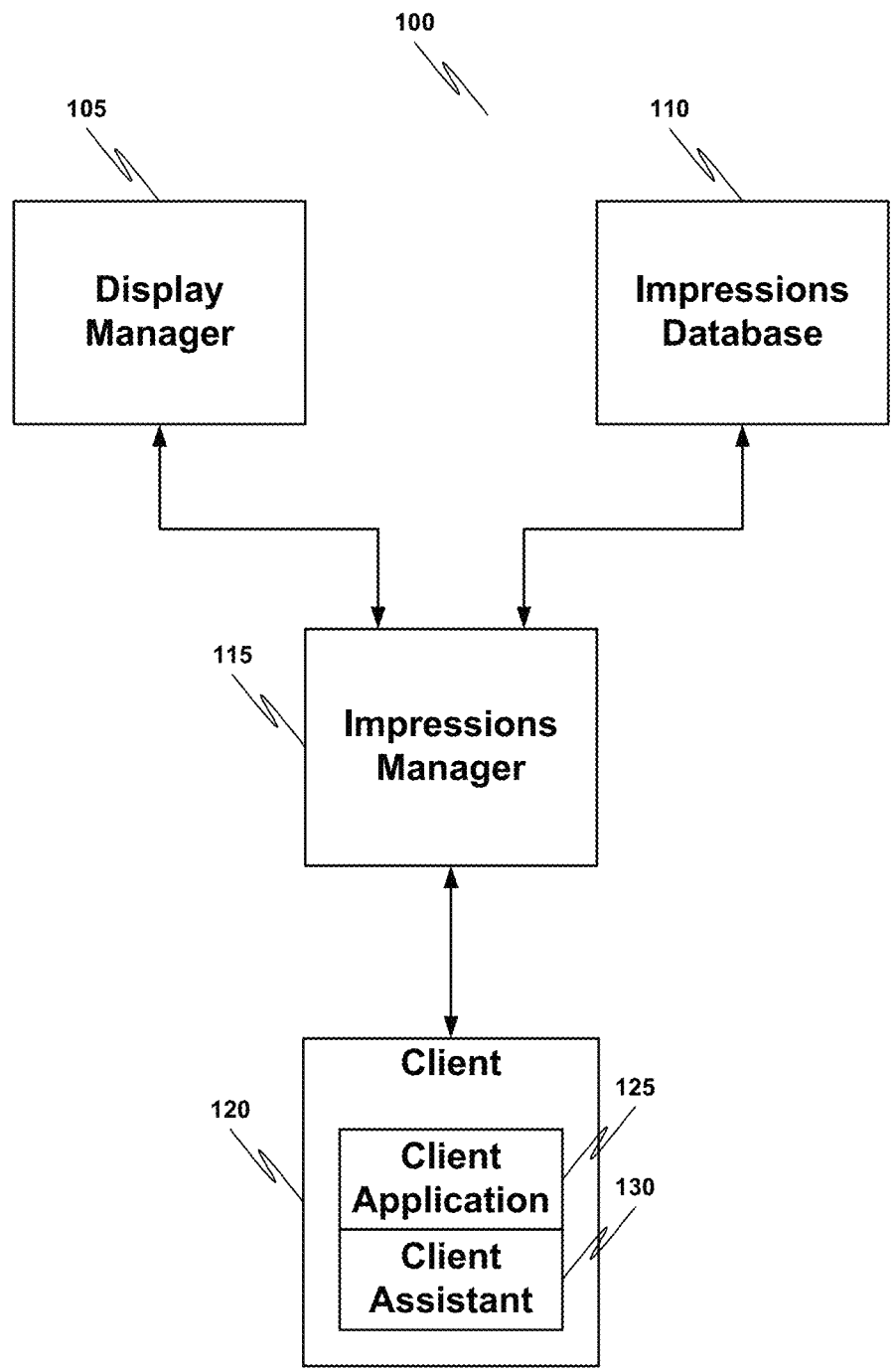
FIG. 1 illustrates a high level functional description of a system in accordance with some embodiments of the present disclosure.

FIG. 1 illustrates a high level functional description of a system 100 in accordance with some embodiments of the present disclosure. An impressions manager 115 is connected to a client 120, a display manager 105, and an impressions database 110. Impressions manager 115 receives from the client 120 information regarding content of the impressions, a target audience for the impressions, and geolocation information, for display of the impressions to the target audience via client device(s) associated with the target audience when the target audience is within a predetermined area including the geolocation associated with the impressions, and stores the information in impressions database 110. Impressions manager 115 also determines whether a client device 120 is within a predetermined area including a geolocation associated with an impression, and if the client device 120 is within the predetermined area, interfaces with display manager 105 to make the impressions viewable by the target audience via the client device(s) 120 associated with the target audience.

Example System Description

Figure 2:
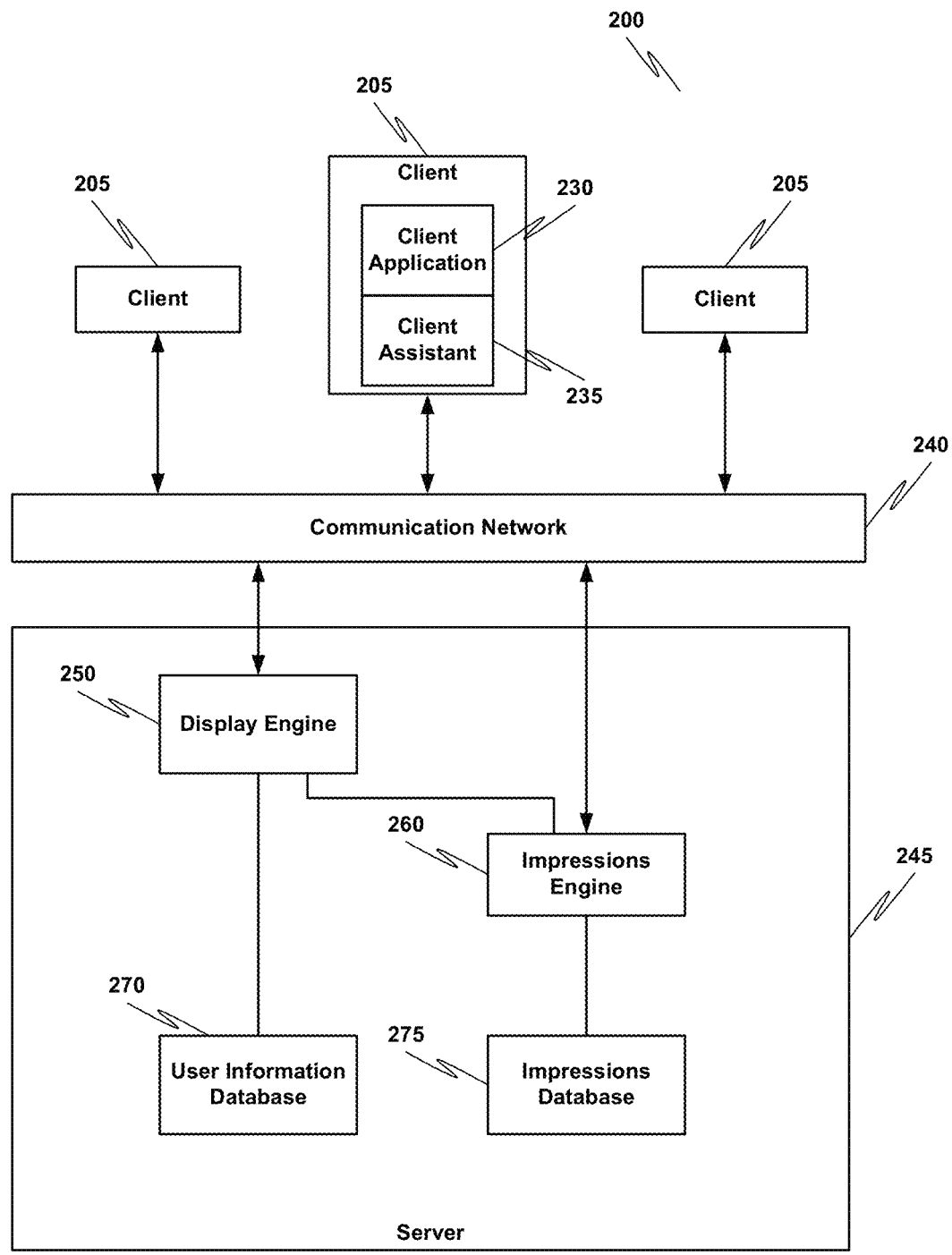
FIG. 2 depicts a block diagram of a system in accordance with some embodiments of the present disclosure.

FIG. 2 depicts a block diagram of a system in accordance with some embodiments of the present disclosure. One or more clients 205 are connected to a communication network 240. The communication network 240 is connected to a server 245. The server 245 includes an impressions engine 260, a display engine 250, a user information database 270, and an impressions database 275. The impressions engine 260 is connected to the communication network 240, the display engine 250, and the impressions database 275. The impressions engine 260 handles requests from and responses to the client assistant 235, via its connection with communication network 240. The display engine 250 is connected to the communication network 240 and the user information database 270.

Each client 205 includes a client application 230 and a client assistant 235. The client 205 can be any number of devices (e.g., computer, internet kiosk, personal digital assistant, cell phone, gaming device, desktop computer, laptop computer, tablet computer, a television with one or more processors embedded therein or attached thereto, or a set-top box) which may be used to connect to the communication network 240. The communication network 240 may be a wireless, optical, wired or other type of network that facilitates the passage of information. It may include the Internet, one or more local area networks (LANs), one or more wide area networks (WANs), other types of networks, or a combination of such networks. The client application 230 is an application that is executed by the client (e.g., browser, e-mail client, word processor) and that displays or presents information to a user of the client (the client application may also perform other tasks not relevant to the present discussion). The client assistant 235 is an application that facilitates the display or presentation of information by the client application 230. The client assistant 235 can be part of the client application 230, a plug-in to the client application 230, stand-alone application, or otherwise (e.g., a JavaScript application downloaded as part of a web page). In some embodiments, the client assistant 235, or portions of the client assistant are downloaded along with messages or other information sent to the client 205. For instance, the client assistant 235 may be one or more scripts (e.g., JavaScript programs) embedded in other content. In this way, different versions of the client assistant 235 are provided to the client 205 without requiring any explicit action by the user of the client 205. Client 205 may also include a location determiner for reporting a geolocation of the client 205.

FIG. 2 is exemplary, in some embodiments, the server 245 contains a subset of or superset of those elements illustrated in FIG. 2. Although FIG. 2 shows the server 245 as a number of discrete items, the figure is intended more as a functional description of the various features which may be present in the server 245 rather than a structural schematic of the embodiments described herein. In practice, and as recognized by those of ordinary skill in the art, items shown separately could be combined and some items could be separated. For example, some items shown separately in the figure could be implemented on a single server and single items could be implemented by one or more servers. The actual number of servers in receipt server 245 and how features are allocated among them will vary from one implementation to another, and may depend in part on the amount of traffic that the system must handle during peak usage periods as well as during average usage periods. For example, any of the user information database 270 and impressions database 275 could be implemented as a stand-alone server or servers.

The impressions engine 260 receives from the client 205 information regarding impressions, a target audience for the impressions, and geolocation information, and stores the information in impressions database 275. Impressions engine 260 also determines whether the client 205 is within a predetermined area including a geolocation associated with an impression, and if the client 205 is within a predetermined area including a geolocation associated with an impression, interfaces with display engine 250 to make the impressions viewable by the target audience via client device(s) 205 associated with the target audience. The user information database 270 contains information about users associated with client devices 205, including any preferences they may have with respect to the display of items. The impressions database 275 includes information about impressions, including the content of the impression, a target audience for the impression, and a geolocation associated with the impression.

Creating Geolocation Impressions

Figure 3:
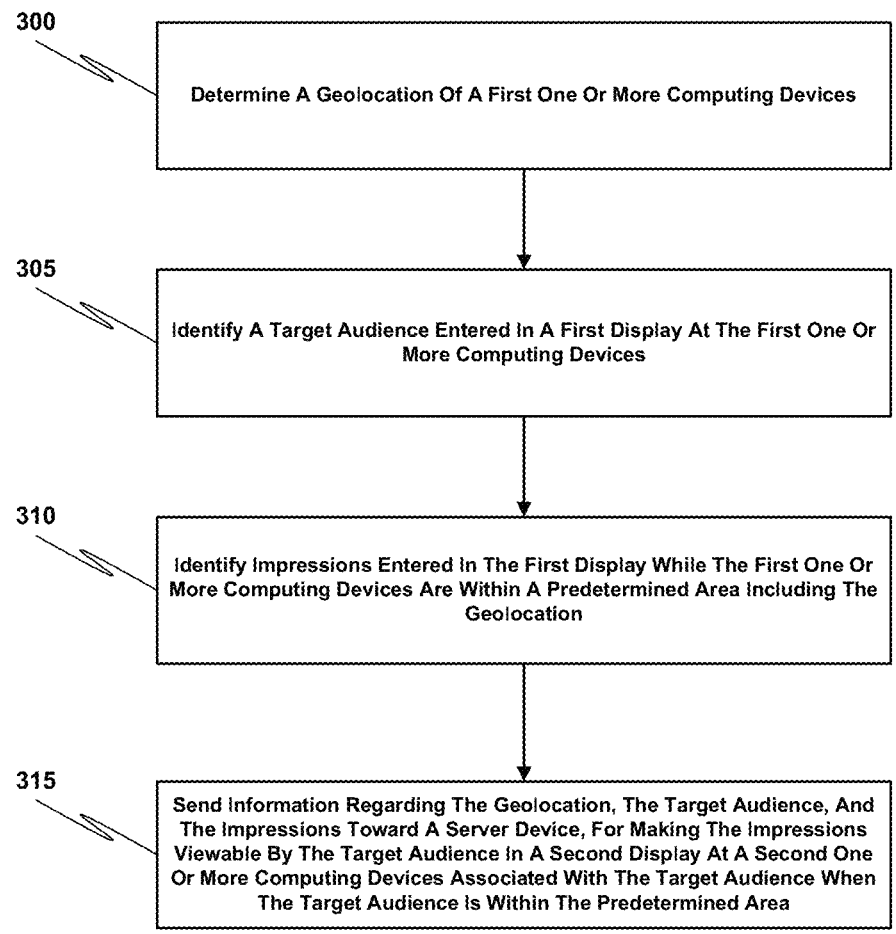
FIG. 3 depicts a process for creating geolocation impressions from the perspective of a client device in accordance with some embodiments of the present disclosure.

FIG. 3 depicts a process for creating geolocation impressions from the perspective of a client device 205 in accordance with some embodiments of the present disclosure. At 300, a geolocation of a first one or more computing devices 205 is determined. At 305, a target audience entered in a first display at the first one or more computing devices 205, is identified. A target audience may be identified by, for example, a username or a group name representing multiple users. At 310, impressions entered in the first display while the first one or more computing devices 205 is within a predetermined area including the geolocation, is identified. At 315, information regarding the geolocation, the target audience, and the impressions is sent to a server 245, for making the impressions viewable by the target audience in a second display at a second one or more computing devices 205 associated with the target audience when the target audience is within the predetermined area.

According to one embodiment, the target audience comprises one or more friends of a user in a social network. For example, the target audience may comprise a user's friends from work, friends from school, family members, or teammates. According to another embodiment, the target audience is all users.

According to one embodiment, the one or more impressions comprise a voice recording. A user may store a voice recording of the user providing his or her impressions of a geolocation. For example, the user may store a voice recording of the user commenting on restaurant food, a hiking trail, a museum exhibit, a sports venue, or the like. As a further example, the user may store a recording of the geolocation, such as ambient noise at the geolocation.

According to one embodiment, the one or more impressions comprise a digital image. A user may store a digital image of scenes at or near the geolocation. For example, the user may store a digital image of the user at the geolocation, a digital image of other people at the geolocation, a digital image of inanimate objects at the geolocation, a digital image of wildlife at the geolocation, a digital image of the geolocation itself, a digital image representing what a user was thinking about while at the geolocation, or a combination thereof.

According to one embodiment, the one or more impressions comprise a text message. A user may store a text message of the user providing his or her impressions of a geolocation. For example, the user may store a text message containing the user's comments on restaurant food, a hiking trail, a museum exhibit, a sports venue, or the like.

According to one embodiment, the one or more impressions comprise a video recording. A user may store a video recording of activity at or near the geolocation. For example, the user may store a video recording of the user at the geolocation, a video recording of other people at the geolocation, a video recording of inanimate objects at the geolocation, a video recording of wildlife at the geolocation, a video recording of the geolocation itself, a video recording representing what a user was thinking about while at the geolocation, or a combination thereof.

According to one embodiment, a geolocation impression may be referenced by a URL. For example, a user may store a URL that points to a voice recording, a digital image, a text message, or a video recording.

According to one embodiment, the information about a geolocation impression is sent to a server while an author of the geolocation impression is at or near the geolocation associated with the impression. For example, a user may upload impressions to a server and make the impressions available to an audience designated by the user while the user is present at or near the geolocation.

According to one embodiment, the information about a geolocation impression is sent to a server after an author of the geolocation impression is no longer at or near the geolocation associated with the impression. For example, the user may store impressions on the computing device 205 or in a cloud while the user is present at or near the geolocation, and then make the impressions available to the user's friends at a later time. Or the mobile user device may keep track of the geolocations visited and the user may store impressions of the geolocations and make the impressions available to an audience designated by the user at a later time.

According to one embodiment, the geolocation impression information is sent to a cloud for storage in the cloud. According to one embodiment, the geolocation impression information is sent to a server for storage in the server. According to yet another embodiment, the geolocation impression information is stored on the computing device associated with an author of the geolocation impression.

According to one embodiment, a geolocation impression may be edited after it is stored. For example, a user may edit a text message later, when the user is no longer at or near the geolocation associated with the impression, to correct spelling or grammatical errors, to remove content, or to add content.

According to one embodiment, a geolocation impression may be added only if a computing device associated with the user is within a predetermined area including the geolocation. This restriction may help to ensure more accurate and higher quality information regarding the geolocation.

According one embodiment, a user may associate a rating with a geolocation. According to another embodiment, both a user's geolocation impression and the user's rating of the geolocation are renderable to a target audience designated by the user. According to another embodiment, a user's rating of a geolocation is renderable to those who are not in a target audience designated by the user, but the user's impressions of the geolocation are renderable to only those who are in the target audience.

Rendering Geolocation Impressions

Figure 4:
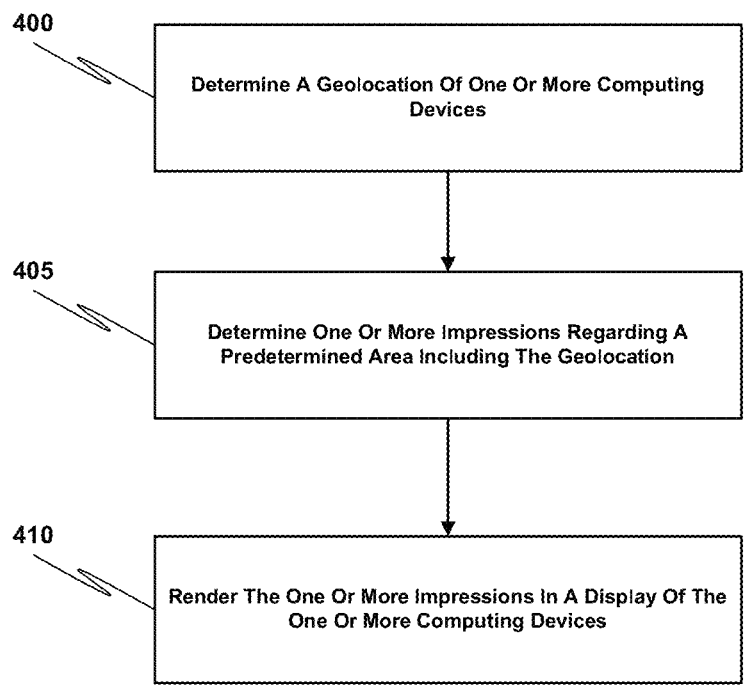
FIG. 4 depicts a process for rendering geolocation impressions from the perspective of a client device in accordance with some embodiments of the present disclosure.

FIG. 4 depicts a process for rendering geolocation impressions from the perspective of a client device in accordance with some embodiments of the present disclosure. At 400, a geolocation of one or more computing devices (205) is determined. At 405, one or more impressions regarding a predetermined area including the geolocation is determined. For example, a predetermined area may be an area within a 1,000-foot radius of the geolocation. Depending on the size and shape of the predetermined area, the predetermined area may include impressions from multiple users regarding multiple geolocations. At 410, the one or more impressions are rendered in a display of the one or more computing devices (205).

According to one embodiment, the impressions within a predetermined area including a geolocation are determined by reading the one or more impressions from a cloud. According to another embodiment, the impressions within a predetermined area including a geolocation are determined by reading the one or more impressions from a server 245. According to another embodiment, the impressions within a predetermined area including a geolocation are determined by reading the one or more impressions from a memory of the computing device 205.

According to one embodiment, a date is associated with a geolocation impression when the geolocation impression is created. The default granularity of the date can be defined in a settings section. For example, the granularity could be in the form of year only, year and month, year, month, and hour, or year, month, hour, and second. According to another embodiment, a user may remove a date, or change the default such that a date is not automatically associated with a geolocation impression.

Managing Geolocation Impressions

Figure 5:
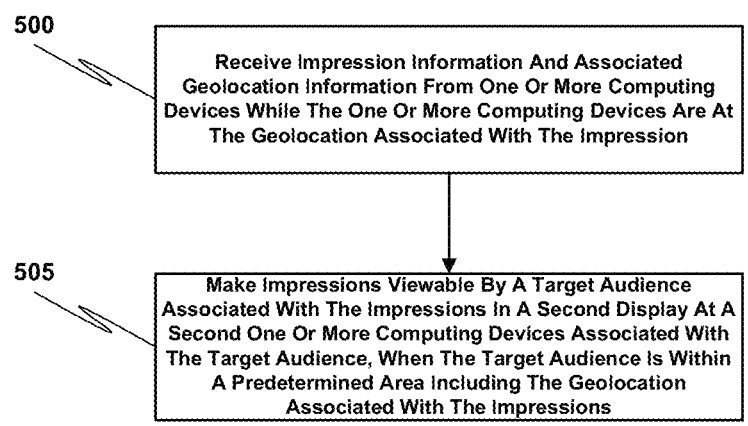
FIG. 5 depicts a process for geolocation impressions from the perspective of a server in accordance with some embodiments of the present disclosure.

FIG. 5 depicts a process for geolocation impressions from the perspective of a server in accordance with some embodiments of the present disclosure. At 500, impression information and associated geolocation information is received from client devices 205 while the client devices 205 are at the geolocation associated with the impression. At 505, impressions are made viewable by a target audience associated with the impressions, when the computing devices 205 associated with the target audience are within a predetermined area including the geolocation associated with the impressions.

According to one embodiment, a client device 205 is configured to display a map augmented to show a predetermined area including a geolocation reported by the client device 205, and one or more impressions regarding other geolocations within the predetermined area. This is described in more detail below, with reference to FIG. 6.

Geolocation Impression Map

Figure 6:
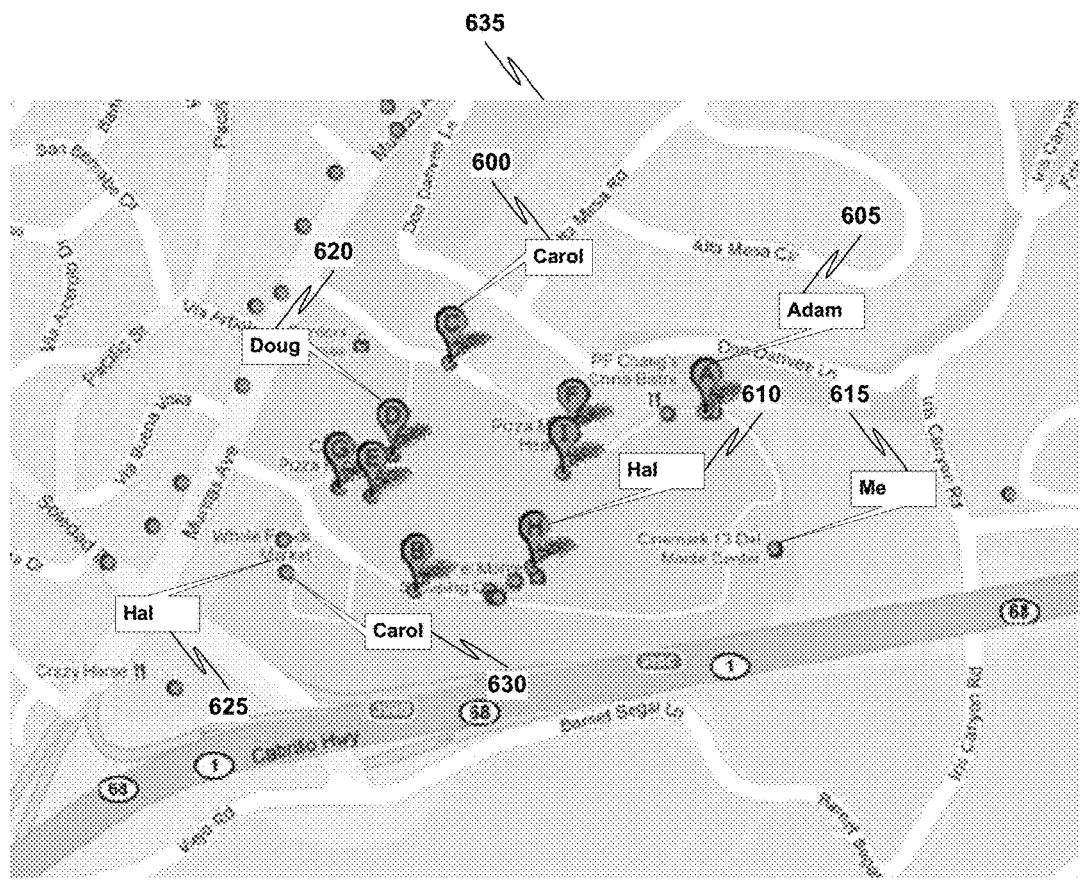
FIG. 6 depicts a map augmented to show geolocations near a user's geolocation, in accordance with one embodiment.

FIG. 6 depicts a map augmented to show geolocations near a user's geolocation, in accordance with one embodiment. In FIG. 6, the user 615 of a mobile user device is shown in map 635 near "Cinemark 13 Del Monte Center." Map 635 has been augmented to show impressions of a target audience designated by user 615. Adam left one impression 605 regarding a geolocation near user 615. Carol left a first impression 600 regarding a first geolocation near user 615, and a second impression 630 regarding a second geolocation near user 615. Doug left an impression 620 regarding a geolocation near user 615. And Hal left a first impression 601 regarding a geolocation near user 615, and a second impression 625 regarding a second geolocation near user 615. While map 635 includes icons (600, 605, 610, 620, 625, 630) showing names of friends, other images could be used to represent a target audience designated by user. The user 615 of the mobile user device may select any of the icons (600, 605, 610, 620, 625, and 630) to view or listen to impressions left by other users.

Example User Interface

According to one embodiment, one or more filters are applied to an augmented map 335 to limit the display of geolocation impressions. For example, the map may be limited to displaying geolocation impressions based on the age of the geolocation impressions or the type of geolocation impression.

According to one embodiment, icons on the augmented map may indicate the type of the geolocation, for example one type of icon may indicate a restaurant, another type of icon may indicate a hiking trail, and another type of icon may indicate a museum.

Figure 7:
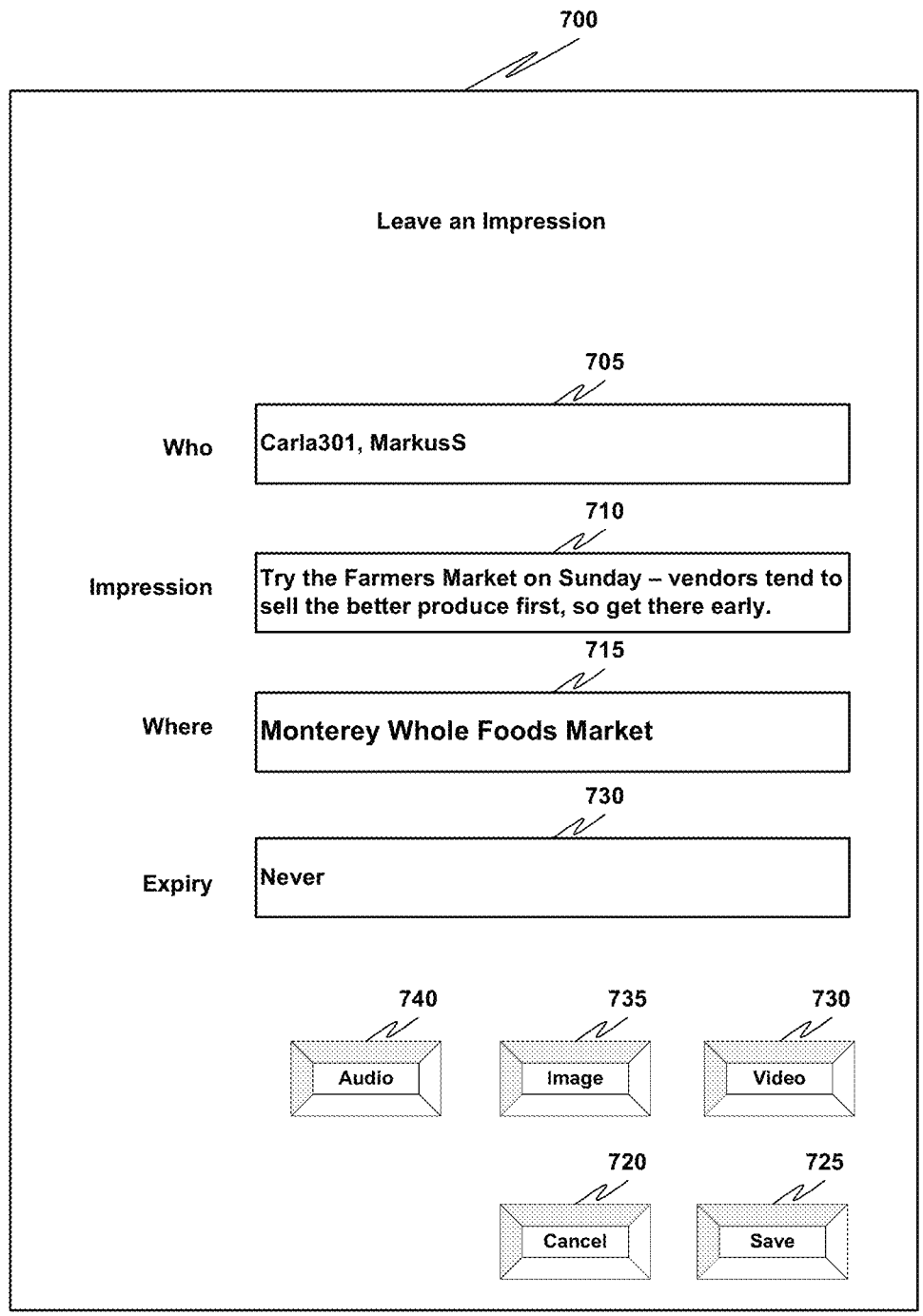
FIG. 7 depicts an exemplary impression configuration display in accordance with some embodiments of the present disclosure.

FIG. 7 depicts an exemplary impression configuration display in accordance with some embodiments of the present disclosure. Display 700 includes a box 705 for entering a target audience for an impression. Display 700 also includes a box 710 for entering the text content of an impression. Display 700 also includes button 740, which when selected, may cause the client device to accept input regarding an impression in the form of an audio file. The audio file may be selected from one or more audio files stored in a memory of the client device, or in a memory of server 245. The audio file may also be selected from an audio recorder application on the client device 205, or on server 245. Display 700 also includes button 735, which when selected, may cause the client device 205 to accept input regarding an impression in the form of a digital image. The digital image may be selected from one or more digital images stored in a memory of the client device 205, or in a memory of server 245. The digital image may also be selected from a camera application on the client device 205, or on server 245. Display 700 also includes button 730, which when selected, may cause the client device 205 to accept input regarding an impression in the form of a video file. The video file may be selected from one or more video files stored in a memory of the client device 205, or in a memory of server 245. The video file may also be selected from a camcorder application on the client device 205, or on server 245. Display 700 also includes a box 715 for entering a name for the geolocation reported by a client device 205 on which display 700 is rendered. Other client devices 205 must be within a predetermined area including the location identified in box 715 in order for the impression in box 710 to be viewable by the target audience indicated in box 705. Display 700 also includes a box 730 for entering an expiry value for the impression.

According to some embodiments, display 700 also includes a box for entering an action to be taken upon expiry of the impression, for example, deleting the impression or making the impression viewable by a different target audience. Once a user has entered information as shown in display 700, the impression shown in box 710 will be made viewable by users "Carla301" and "MarkusS" when their respective client devices 205 report a geolocation within the predetermined area including the location identified in box 715. The location identified in box 715 may be prepopulated with geolocation information reported by the client device 205. As indicated in box 730, the impression will not expire before the preconditions in box 715 are met. Display 700 also includes a button 725 which, when clicked on, causes the information entered in boxes 705, 710, 715, and 730, to be saved. Display 700 also includes a button 720 which, when clicked on, causes the information entered in boxes 705, 710, 715, and 730, to be discarded.

Figure 8:
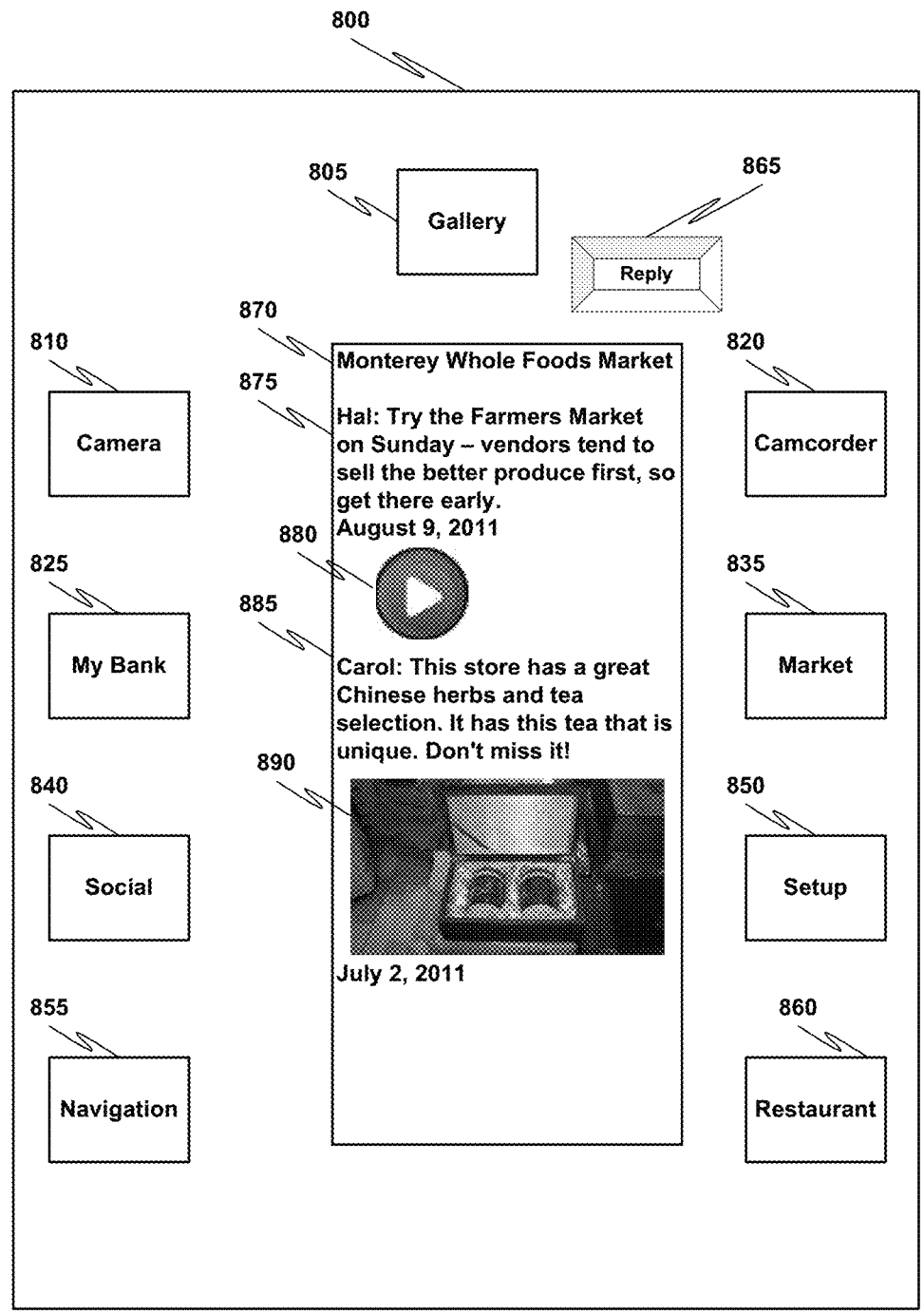
FIG. 8 depicts a display including an impression box corresponding to the configuration display of FIG. 7 in accordance with some embodiments of the present disclosure.

FIG. 8 depicts a display including an impression box corresponding to the configuration display of FIG. 7 in accordance with some embodiments of the present disclosure. FIG. 8 shows impressions of users regarding geolocations near a geolocation of a client device 205 associated with the user. Display 800 shows the geolocation of the user is "Monterey Whole Foods Market" 870. Hal left a text message 875 regarding geolocation 870. Hal also left a voice recording 880 regarding geolocation 870. A user may click on or select voice recording 880 to render the voice recording. Carol also left a text message 885 regarding geolocation 870, and Carol left a digital image 890 regarding geolocation 870. A user may click on or select digital image 890 to render the digital image 890.

Example Data Structures

FIG. 9 depicts a data structure for storing certain user information in accordance with some embodiments of the present disclosure. FIG. 9 illustrates an exemplary user table 900 in a user information database 270 which is used in some embodiments to store information about users. In some embodiments, table 900 includes a plurality of records, each having a userID portion 905 and one or more other portions containing information about the user. Table 900 includes one or more records such as record 930 associated with a userID #1, and record 945 associated with a userID #U, where U represents the number of users with a record in user table 900. The record 930 includes one or more items of information about a user, such as the user's notification preference 910, display preference 915, impressions left 920, and impressions viewed 925. The notification preference may indicate how the user prefers to be notified, for example, which devices 205 should display an impression, and whether the rendering of the impression should be accompanied by an audible, tactile, or visual cue. The display preference 915 may indicate a user's preferences with regard to the display of information, and how much information about the user is disclosed to third parties. According to some embodiments, no user information is disclosed to third parties by default. Record 930 may also indicate impressions that a user has left. Record 930 may also indicate impressions of a user that have been viewed 925 by the target audience. The entries in any particular record 930, 935, 940, and 945 are merely exemplary. In some embodiments, users may have differing sets of entries in their respective record.

Figure 10:
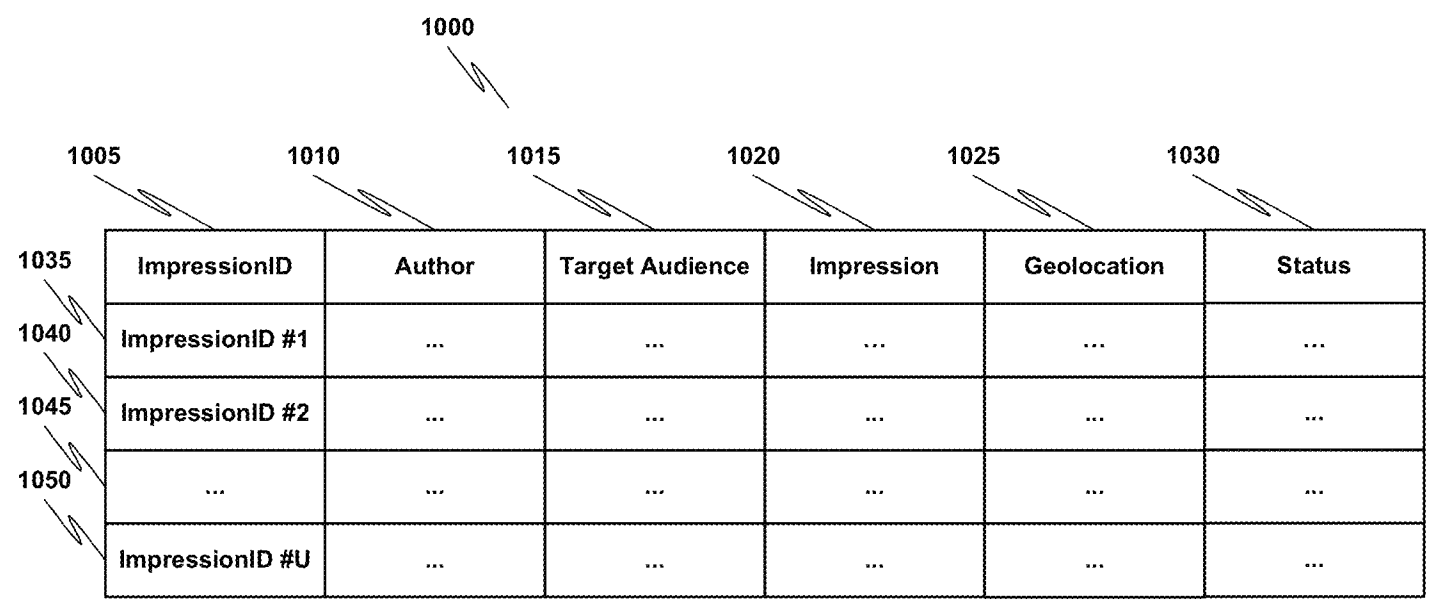

FIG. 10 depicts a data structure for storing certain impression information in accordance with some embodiments of the present disclosure. FIG. 10 illustrates an exemplary table 1000 in impressions database 275 which is used in some embodiments to store information about impressions. In some embodiments, table 1000 includes a plurality of records, each having an ImpressionID portion 1005 and one or more other portions containing information about the impression. Table 1000 includes one or more records such as record 1035 associated with an ImpressionID #1, and record 1050 associated with an ImpressionID #U, where U represents the number of impressions with a record in impressions table 1000. The record 1035 includes one or more items of information about an impression, such as the author of the impression (1010), the target audience of the impression (1015), the content of the impression 1020, a geolocation associated with the impression (1025), and a status of the impression (1030). The author of the impression (1010) indicates which user created the impression. The target audience 1015 indicates which users the author of the impression wants to experience the impression when client devices 205 associated with the users report a geolocation in a predetermined area including the geolocation 1025 associated with the impression. The impression content 1020 may be, for example, a text message, an audio file, a video file, or a digital image file. The status 1030 indicates the status of the impression 1020, for example which members of the target audience 1015 have viewed the impression 1020, and whether the impression has expired. The entries in any particular record 1035, 1040, 1045, and 1050 are merely exemplary. In some embodiments, impressions may have differing sets of entries in their respective record.

Additional Embodiments

According to another embodiment, a user asks a friend for access to geolocation impressions from the friend's friends. Suppose Adam lives in New York and travels to London, where Adam has a single friend, Bob. Bob has several friends in London, but none of Bob's London friends are friends of Adam. According to this embodiment, Adam requests Bob for access to geolocation impressions of Bob's friends. Bob in turn may post Adam's request to Bob's friends. Bob's friends may either deny the request, or grant the request for a limited period of time.

Figure 11:
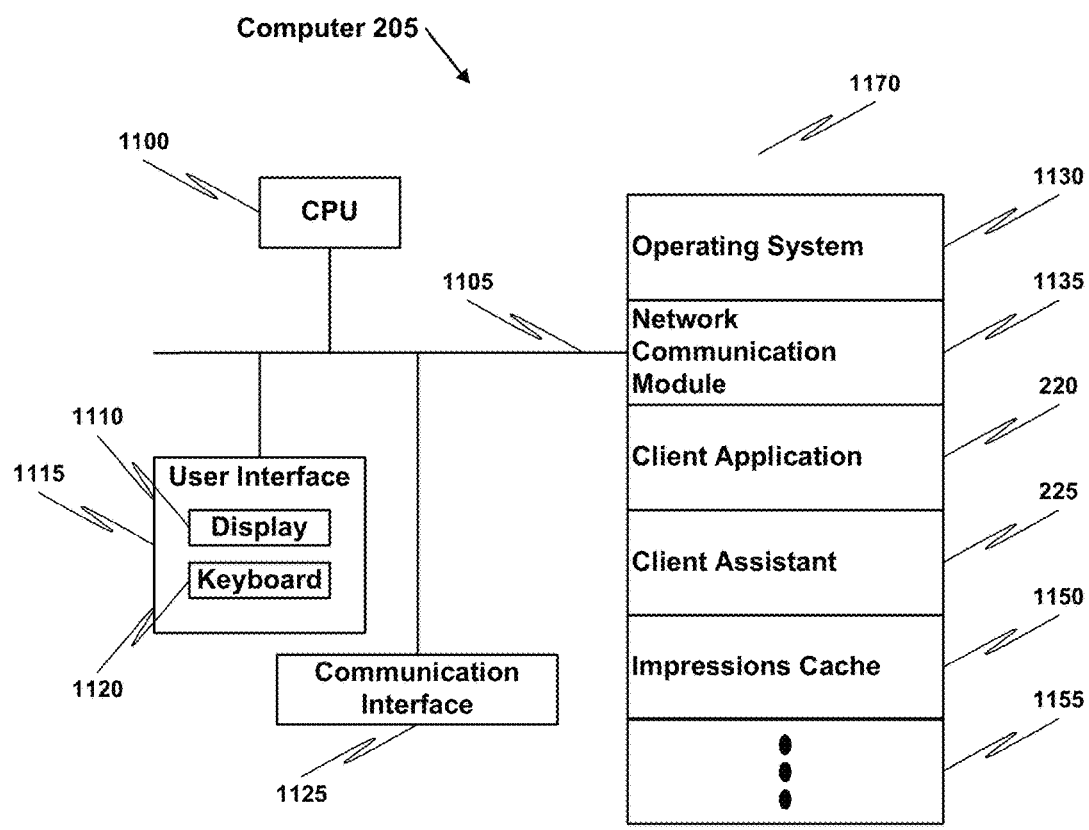
FIG. 11 depicts a client device in accordance with some embodiments of the present disclosure.

FIG. 11 depicts a client device in accordance with some embodiments of the present disclosure. A client system 205 typically includes one or more processing units (CPU's) 1100, one or more network or other communications interfaces 1125, memory 1170, and one or more communication buses 1105 for interconnecting these components. The client system 205 may include a user interface 1115, for instance, a display 1110 and a keyboard 1120. The memory 1170 may include high speed random access memory and may also include non-volatile memory, such as one or more magnetic or optical storage disks. The memory 1170 may include mass storage that is remotely located from CPU's 1100. The memory 1170 may store the following elements, or a subset or superset of such elements: an operating system 1130 that includes procedures for handling various basic system services and for performing hardware dependent tasks; a network communication module (or instructions) 1135 that is used for connecting the customer client system 205 to other computers via the one or more communications interfaces 1125 (wired or wireless), such as the Internet, other wide area networks, local area networks, metropolitan area networks, and so on; a client application 220 as described above; a client assistant 225 as described above; optionally, a cache of downloaded impressions 1150, as well as other information for viewing using the client application 125, and information retrieved by user selection of one or more items. The client system 205 may also include a location determiner for reporting a geolocation of the client system.

Figure 12:
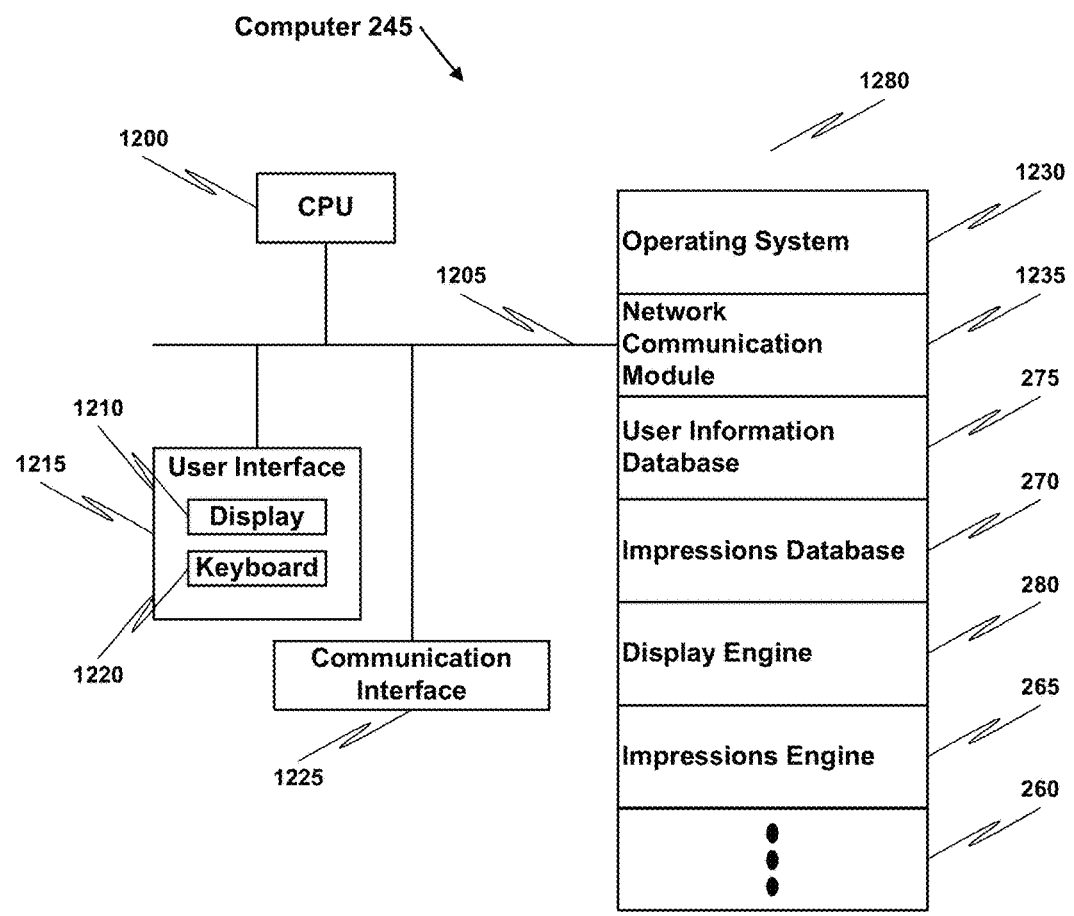
FIG. 12 depicts a server device in accordance with some embodiments of the present disclosure.

FIG. 12 depicts a server device in accordance with some embodiments of the present disclosure. A server 245 typically includes one or more processing units (CPU's) 1200, one or more network or other communications interfaces 1225, memory 1280, and one or more communication buses 1205 for interconnecting these components. The server 245 may include a user interface 1215, including a display 1210 and a keyboard 1220. The memory 1280 may include high speed random access memory and may also include non-volatile memory, such as one or more magnetic or optical storage disks. The memory 1280 may include mass storage that is remotely located from CPU's 1200. The memory 1280 may store the following elements, or a subset or superset of such elements: an operating system 1230 that includes procedures for handling various basic system services and for performing hardware dependent tasks; a network communication module (or instructions) 1235 that is used for connecting the server system 245 to other computers via the one or more communications interfaces 1225 (wired or wireless), such as the Internet, other wide area networks, local area networks, metropolitan area networks, and so on; a user information database 270 for storing user information, an impressions database 275 for storing impressions information, a display engine (or instructions) 250 for identifying what items to display and for formatting the items for display as described above, and an impressions engine (or instructions) 260 for storing and displaying information regarding impressions as described above.

Although illustrated and described in relation to client devices and server devices, it should be understood that the techniques described herein apply equally well to other types of computer networks (e.g., peer-to-peer). Furthermore, it should be understood that the techniques described herein apply equally to both wired and wireless networks. Further still, one of ordinary skill in the art will readily recognize that the techniques described herein can be applied to client applications other than applications for email or web browsing.

Each of the above identified modules or programs correspond to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory 1170 or 1280 may store a subset of the modules and data structures identified above. Furthermore, memory 1170 or 1280 may store additional modules and data structures not described above.

Although some of various drawings illustrate a number of logical stages in a particular order, stages which are not order dependent may be reordered and other stages may be combined or broken out. Alternative orderings and groupings, whether described above or not, may be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, executing on a first computing device, for geolocation impressions, said method comprising:
   determining, at the first computing device, a geolocation of the first computing device;
   identifying, at the first computing device, a first target audience entered by a first user in a first display of the first computing device;

determining whether the first computing device is within a predetermined area including the geolocation;

in response to determining that the first computing device is within the predetermined area including the geolocation, identifying using the geolocation, an impression including content describing a comment from the first user regarding the predetermined area including the geolocation, an expiry value for the impression, and an action to be performed upon an expiry of the impression based on the expiry value, wherein the impression, the expiry value, and the action is entered by the first user in the first display at the first computing device; and sending, at the first computing device, information regarding the geolocation, the first target audience, the impression, the expiry value, and the action to a cloud computing device for storage, and for making the impression viewable by the first target audience prior to the expiry of the impression in a second display at a second computing device associated with the first target audience when the second computing device is within the predetermined area.

2. The method of claim 1, wherein the first target audience comprises one or more friends of the first user in a social network.

3. The method of claim 1, wherein the impression comprises a voice recording.

4. The method of claim 1, wherein the impression comprises a digital image.

5. The method of claim 1, wherein the impression comprises a text message.

6. The method of claim 1, wherein the impression comprises a video recording.

7. The method of claim 1, wherein the action to be performed upon the expiry of the impression includes making the impression viewable by a second target audience in a third display at a third computing device associated with the second target audience when the third computing device is within the predetermined area, the second target audience being entered by the first user in the first display of the first computing device.

8. The method of claim 1, wherein the action to be performed upon the expiry of the impression includes deleting the impression.

9. The method of claim 1, further comprising storing an indication in the cloud computing device for the first user that the impression has been viewed responsive to the impression being viewed by the first target audience.

10. The method of claim 1, further comprising editing the impression after the sending.

11. A method, executing on a first computing device, for geolocation impressions, said method comprising:

determining, at the first computing device, a geolocation of the first computing device associated with a first user;

determining, at the first computing device, an impression including content describing a comment from a second user regarding a predetermined area including the geolocation, an expiry value for the impression, and an action to be performed upon an expiry of the impression based on the expiry value, wherein the impression, the expiry value, and the action are received from a second computing device associated with the second user while the second computing device is at the geolocation associated with the impression; and rendering, at the first computing device, on a map augmented to show the impression including content describing the comment from the second user regarding the predetermined area including the geolocation in a display of the first computing device associated with the first user prior to the expiry of the impression, wherein the map includes impressions regarding other geolocations within the predetermined area.

12. The method of claim 1, further comprising:

identifying, at the first computing device, a rating for the predetermined area including the geolocation entered by the first user in the first display of the first computing device; and sending, at the first computing device, the rating for the predetermined area including the geolocation to the server device, for making the rating viewable by one or more users outside the first target audience in a third display at a third computing device associated with the one or more users when the third computing device is within the predetermined area.

13. A method, executing on a first computing device, for geolocation impressions, said method comprising:

receiving, at the first computing device, impression information including content describing a comment from a user regarding a geolocation, associated geolocation information, an expiry value for the impression information, and an action to be performed upon an expiry of the impression information based on the expiry value from a second computing device while the second computing device is at the geolocation associated with the impression information;

sending the impression information including content describing the comment from the user regarding the geolocation, the associated geolocation information, the expiry value, and the action to a cloud computing device for storage; and making, at the first computing device, the impression information including content describing the comment from the user regarding the geolocation viewable by a target audience associated with the impression information in a display at a third computing device associated with the target audience prior to the expiry of the impression information, when the third computing device is within a predetermined area including the geolocation associated with the impression information.

14. A first computer system for geolocation impressions, comprising:

one or more processors; and
memory to store:
one or more programs, the one or more programs, when executed on the one or more processors, performing a method comprising:

determining, at the first computer system, a geolocation of the first computer system;

identifying, at the first computer system, a first target audience entered by a first user in a first display of the first computer system;

determining whether the first computer system is within a predetermined area including the geolocation;

in response to determining that the first computer system is within the predetermined area including the geolocation, identifying using the geolocation, an impression including content describing a comment from the first user regarding the predetermined area including the geolocation, an expiry value for the impression, and an action to be performed upon an expiry of the impression based on the expiry value, wherein the impression, the expiry value, and the action are entered by the first user in the first display at the first computer system; and sending, at the first computer system, information regarding the geolocation, the first target audience, the impression, the expiry value, and the action to a cloud computing device for storage, and for making the impression viewable by the first target audience prior to the expiry of the impression in a second display at a second computer system associated with the first target audience when the second computer system is within the predetermined area.

15. The system of claim 14, wherein the one or more programs performing the method further comprises:

identifying, at the first computer system, a rating for the predetermined area including the geolocation entered by the first user in the first display of the first computer system; and sending, at the first computer system, the rating for the predetermined area including the geolocation to the server device, for making the rating viewable by one or more users outside the first target audience in a third display at a third computer system associated with the one or more users when the third computer system is within the predetermined area.

16. A computer system for geolocation impressions, comprising:

one or more processors; and memory to store:

one or more programs, the one or more programs, when executed on the one or more processors, performing a method comprising:

determining, at the computer system, a geolocation of a first computing device associated with a first user;

determining, at the computer system, an impression including content describing a comment from a second user regarding a predetermined area including the geolocation, an expiry value for the impression, and an action to be performed upon an expiry of the impression based on the expiry value, wherein the impression, the expiry value, and the action are received from a second computing device associated with the second user while the second computing device is at the geolocation associated with the impression; and rendering, at the computer system, on a map augmented to show the impression including content describing the comment from the second user regarding the predetermined area including the geolocation in a display of the first computing device associated with the first user prior to the expiry of the impression, wherein the map includes impressions regarding other geolocations within the predetermined area.

17. A first computer system for geolocation impressions, comprising:

one or more processors; and memory to store:

one or more programs, the one or more programs, when executed on the one or more processors, performing a method comprising:

receiving, at the first computer system, impression information including content describing a comment from a user regarding a geolocation, associated geolocation information, an expiry value for the impression information, and an action to be performed upon an expiry of the impression information based on the expiry value from a second computer system while the second computer system is at the geolocation associated with the impression information;

sending the impression information including content describing the comment from the user regarding the geolocation, the associated geolocation information, the expiry value, and the action to a cloud computing device for storage; and making, at the first computing system, the impression information including content describing the comment from the user regarding the geolocation viewable by a target audience associated with the impression information in a display at a third computer system associated with the target audience prior to the expiry of the impression information, when the third computer system is within a predetermined area including the geolocation associated with the impression information.

18. A non-transitory computer readable storage medium storing one or more programs configured to be executed by a first computing device, said programs, when executing on the first computing device, performing a method of:

determining, at the first computing device, a geolocation of the first computing device;

identifying, at the first computing device, a first target audience entered by a first user in a first display of the first computing device;

determining whether the first computing device is within a predetermined area including the geolocation;

in response to determining that the first computing device is within the predetermined area including the geolocation, identifying using the geolocation, an impression including content describing a comment from the first user regarding the predetermined area including the geolocation, an expiry value for the impression, and an action to be performed upon an expiry of the impression based on the expiry value, wherein the impression, the expiry value, and the action are entered by the first user in the first display at the first computing device; and sending, at the first computing device, information regarding the geolocation, the first target audience, the impression, the expiry value, and the action to a cloud computing device for storage, and for making the impression viewable by the first target audience prior to the expiry of the impression in a second display at a second computing device associated with the first target audience when the second computing device is within the predetermined area.

19. A non-transitory computer readable storage medium storing one or more programs configured to be executed by a first computing device, said programs, when executing on the first computing device, performing a method of:

determining, at the first computing device, a geolocation of the first computing device associated with a first user;

determining, at the first computing device, an impression including content describing a comment from a second user regarding a predetermined area including the geolocation, an expiry value for the impression, and an action to be performed upon an expiry of the impression based on the expiry value, wherein the impression, the expiry value, and the action are received from a second computing device associated with the second user while the second computing device is at the geolocation associated with the impression; and rendering, at the first computing device, on a map augmented to show the impression including content describing the comment from the second user regarding the predetermined area including the geolocation in a display of the first computing device associated with the first user prior to the expiry of the impression, wherein the map includes impressions regarding other geolocations within the predetermined area.

20. A non-transitory computer readable storage medium storing one or more programs configured to be executed by a first computing device, said programs, when executing on the first computing device, performing a method of:

receiving, at the first computing device, impression information including content describing a comment from a user regarding a geolocation, associated geolocation information, an expiry value for the impression information, and an action to be performed upon an expiry of the impression information based on the expiry value from a second computing device while the second computing device is at the geolocation associated with the impression information;

sending the impression information including content describing the comment from the user regarding the geolocation, the associated geolocation information, the expiry value, and the action to a cloud computing device for storage; and making, at the first computing device, the impression information including content describing the comment from the user regarding the geolocation viewable by a target audience associated with the impression information in a display at a third computing device associated with the target audience prior to the expiry of the impression information, when the third computing device is within a predetermined area including the geolocation associated with the impression information.

* * * * *